(12) United States Patent
Klemen et al.

(10) Patent No.: US 7,810,592 B2
(45) Date of Patent: Oct. 12, 2010

(54) LIGHT HYBRID VEHICLE CONFIGURATION

(75) Inventors: Donald Klemen, Carmel, IN (US); Michael R. Schmidt, Carmel, IN (US)

(73) Assignee: GM Global Technology Operations, Inc., Detroit, MI (US)

(*) Notice: Subject to any disclaimer, the term of this patent is extended or adjusted under 35 U.S.C. 154(b) by 975 days.

(21) Appl. No.: 11/530,561

(22) Filed: Sep. 11, 2006

(65) Prior Publication Data

US 2008/0060859 A1   Mar. 13, 2008

(51) Int. Cl.
*B60K 6/44* (2007.10)
*B60K 6/442* (2007.10)
*B60W 10/06* (2006.01)
*B60W 20/00* (2006.01)

(52) U.S. Cl. ............ 180/65.225; 180/65.23; 180/65.28; 180/65.285

(58) Field of Classification Search ........... 180/65.21, 180/65.22, 65.225, 65.23, 65.28, 65.285, 180/65.29, 65.31
See application file for complete search history.

(56) References Cited

U.S. PATENT DOCUMENTS

| | | | | |
|---|---|---|---|---|
| 5,789,823 A | * | 8/1998 | Sherman | 290/47 |
| 6,340,339 B1 | * | 1/2002 | Tabata et al. | 475/5 |
| 6,478,101 B1 | * | 11/2002 | Taniguchi et al. | 180/65.22 |
| 6,524,222 B2 | * | 2/2003 | Ootsuka | 477/109 |
| 7,231,994 B2 | * | 6/2007 | Buglione et al. | 180/65.31 |
| 7,509,802 B2 | * | 3/2009 | Hammond et al. | 60/330 |
| 2003/0057004 A1 | * | 3/2003 | Morishita et al. | 180/65.2 |
| 2004/0129465 A1 | * | 7/2004 | Yamaguchi | 180/65.2 |

FOREIGN PATENT DOCUMENTS

DE    4339703 A1    5/1995

* cited by examiner

*Primary Examiner*—Paul N Dickson
*Assistant Examiner*—John R Olszewski
(74) *Attorney, Agent, or Firm*—Quinn Law Group, PLLC

(57) ABSTRACT

The present invention provides a hybrid conversion module configured to easily attach to existing powertrain components in order to produce a light hybrid vehicle. The hybrid conversion module includes an electric motor/generator operable to transmit power to a torque converter and thereby drive the light hybrid vehicle. A storage device such as a battery is operatively connected to the electric motor/generator and is configured to transmit energy to or receive energy from the electric motor/generator. A clutch is configured to selectively decouple the light hybrid vehicle's engine from the torque converter such that the vehicle can be powered by the electric motor/generator in an efficient manner. The apparatus of the present invention also includes a light hybrid vehicle having such a hybrid conversion module attached in the manner described to a conventional powertrain.

14 Claims, 3 Drawing Sheets

LIGHT HYBRID VEHICLE CONFIGURATION

TECHNICAL FIELD

The present invention pertains generally to a light hybrid vehicle configuration with a selectively applied input disconnect clutch.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

It is well known that hybrid vehicles and light hybrid vehicles can offer numerous advantages including, for example, improved fuel economy and reduced emissions. Light hybrid vehicles employ a single motor/generator along with an engine which may individually or in combination drive a transmission in order to power the vehicle.

SUMMARY OF THE INVENTION

The apparatus of the present invention includes a hybrid conversion module configured to easily attach to existing powertrain components and thereby provide a light hybrid vehicle. The hybrid conversion module includes an electric motor/generator operable to transmit power to a torque converter and thereby drive the light hybrid vehicle. A storage device such as a battery is operatively connected to the electric motor/generator and is configured to transmit energy to or receive energy from the electric motor/generator. A clutch is configured to selectively decouple the light hybrid vehicle's engine from the torque converter such that the vehicle can be powered by the electric motor/generator in an efficient manner. The apparatus of the present invention also includes a light hybrid vehicle having such a hybrid conversion module attached in the manner described to a conventional powertrain.

The electric motor/generator may be attached directly to the torque converter such that the torque converter can be implemented to cool the electric motor/generator by transmitting engine heat through the torque converter housing where it is absorbed by working fluid within the torque converter.

The electric motor/generator may be configured to drive a transmission pump such that coolant flow and clutch pressure are maintained when the light hybrid vehicle is electrically driven.

The clutch may be an electro-magnetic clutch.

The storage device may be a battery.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
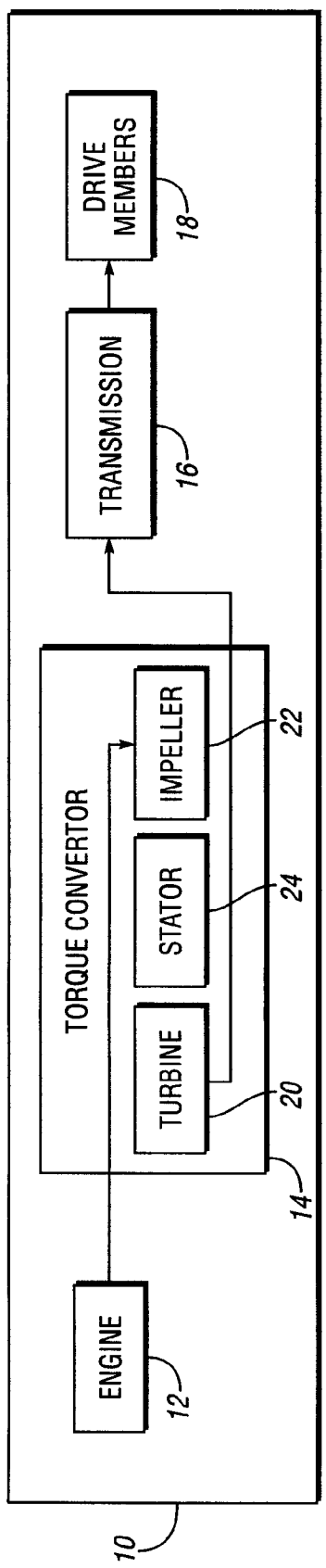
FIG. 1a is a schematic illustration of a prior art non-hybrid vehicle.

Referring to the drawings, FIG. 1a shows a schematic representation of a conventional vehicle 10. The vehicle 10 includes an engine 12, a torque converter 14, a transmission 16 and one or more drive members 18.

The torque converter 14 includes a turbine 20 (a driven member), an impeller 22 (a driving member), and a stator 24. The torque converter 10 further includes a torque converter housing 26 (shown in FIG. 2) attached to the impeller 22 such that a chamber full of working fluid (not shown) is formed therebetween. As will be described in detail hereinafter, the impeller 22 is operatively connected to and driven by the engine 12, and engine torque is transmitted from the impeller 22 to the turbine 20 through an operation of the working fluid. The turbine 20 is operatively connected to the transmission 16 such that torque is transferable therebetween to drive the vehicle 10.

When the engine 12 is running, the rotating impeller 22 causes working fluid (not shown) to be directed outward toward the turbine vanes (not shown). When this occurs with sufficient force to overcome the resistance to rotation, the turbine 20 begins to turn which correspondingly turns the transmission input shaft 25 (shown in FIG. 2). The fluid flow exiting the turbine 20 is directed back into the impeller 22 by way of the stator 24. The stator 24 redirects the fluid flow from the turbine 20 to the impeller 22 in the same direction as impeller rotation, thereby reducing impeller torque and causing torque multiplication.

The transmission 16 transfers power from the engine 12 via the torque converter 14 to the drive members 18. The drive members 18 deliver the tractive effort from the vehicle 10 to the terrain over which the vehicle 10 is being driven. As such, the drive members 18 may be front wheels, rear wheels or a track, as required to provide the desired performance.

Figure 1B:
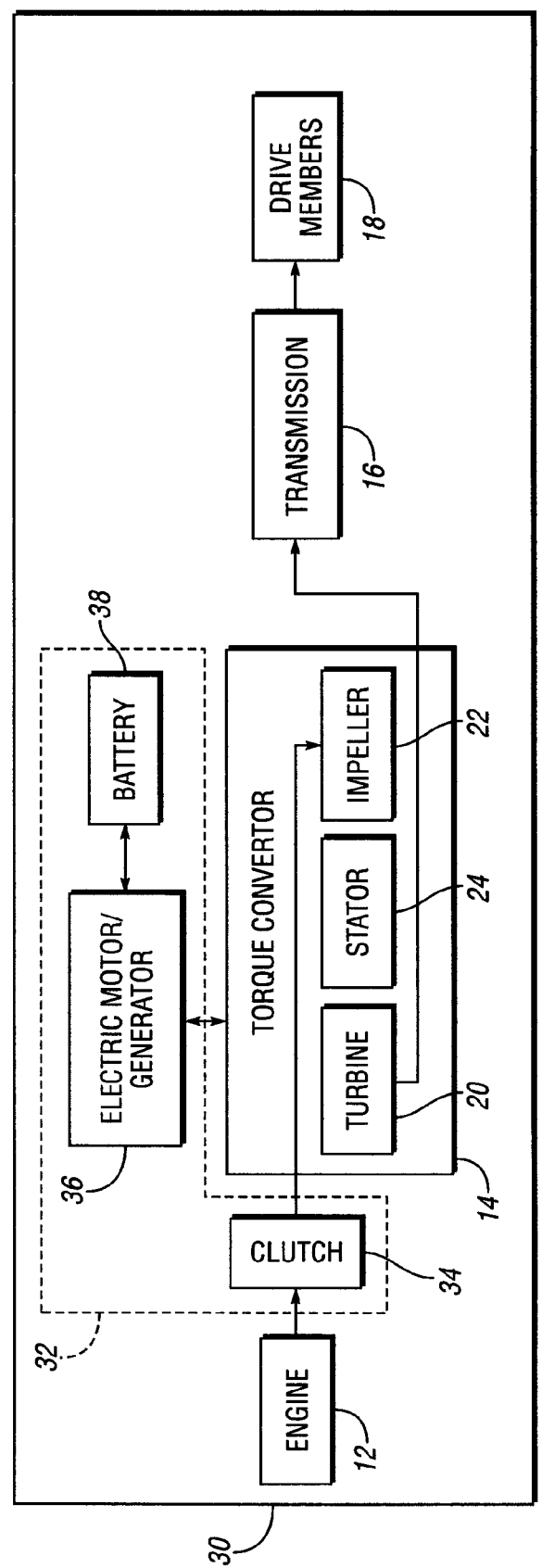
FIG. 1b is a schematic illustration of a light hybrid vehicle in accordance with the present invention.

Referring to FIG. 1b, a schematic representation of a light hybrid vehicle 30 in accordance with the present invention is shown. For purposes of the present invention, a "light hybrid vehicle" is a hybrid vehicle that employs a single motor/generator along with an engine which may individually or in combination power the vehicle. Like reference numbers are used in FIG. 1b to refer to like components from FIG. 1a.

The light hybrid vehicle 30 includes an engine 12, a torque converter 14, a transmission 16 and one or more drive members 18 which are similar to the components previously described with respect to FIG. 1a. The light hybrid vehicle 30 also includes a hybrid conversion module 32 disposed between the engine 12 and the torque converter 14. As will be described in detail hereinafter, the hybrid conversion module 32 is configured to easily attach to a non-hybrid vehicle such as the vehicle 10 (shown in FIG. 1a) and convert it to a light hybrid vehicle such as the light hybrid vehicle 30.

The hybrid conversion module 32 includes an electro-magnetic clutch 34, an electric motor/generator 36 and a battery 38. The electro-magnetic clutch 34 is adapted to selectively couple or decouple the engine 12 and the torque converter 14. When the electro-magnetic clutch 34 is deactivated, the engine 12 and the torque converter 14 are coupled such that the engine 12 may be implemented to power the vehicle 30 in a conventional manner. When the electro-magnetic clutch 34 is activated, the engine 12 and the torque converter 14 are decoupled such that the electric motor/generator 36 may be implemented to power the vehicle 30 without back-driving the engine 12. In other words, activating the electro-magnetic clutch 34 improves vehicle efficiency when the vehicle 30 is being powered by the electric motor/generator 36.

The electric motor/generator 36 can draw energy from the battery 38 in order to power the vehicle 30 by itself or in combination with the engine 12. More precisely, the electric motor/generator 36 can transmit power through the torque converter 14, the transmission 16 and to the drive members 18 to power the vehicle 30. As will be described in detail hereinafter, when the vehicle 30 is being powered by the engine 12, rotation of the torque converter 14 may be converted to energy by the electric motor/generator 36 and stored in the battery 38. Additionally, when the vehicle 30 is decelerating, rotation from the drive members 18 is transferable through the transmission 16 to back-drive the torque converter 14. The rotation of the back-driven torque converter 14 may also be converted to energy by the electric motor/generator 36 and stored in the battery 38.

Figure 2:
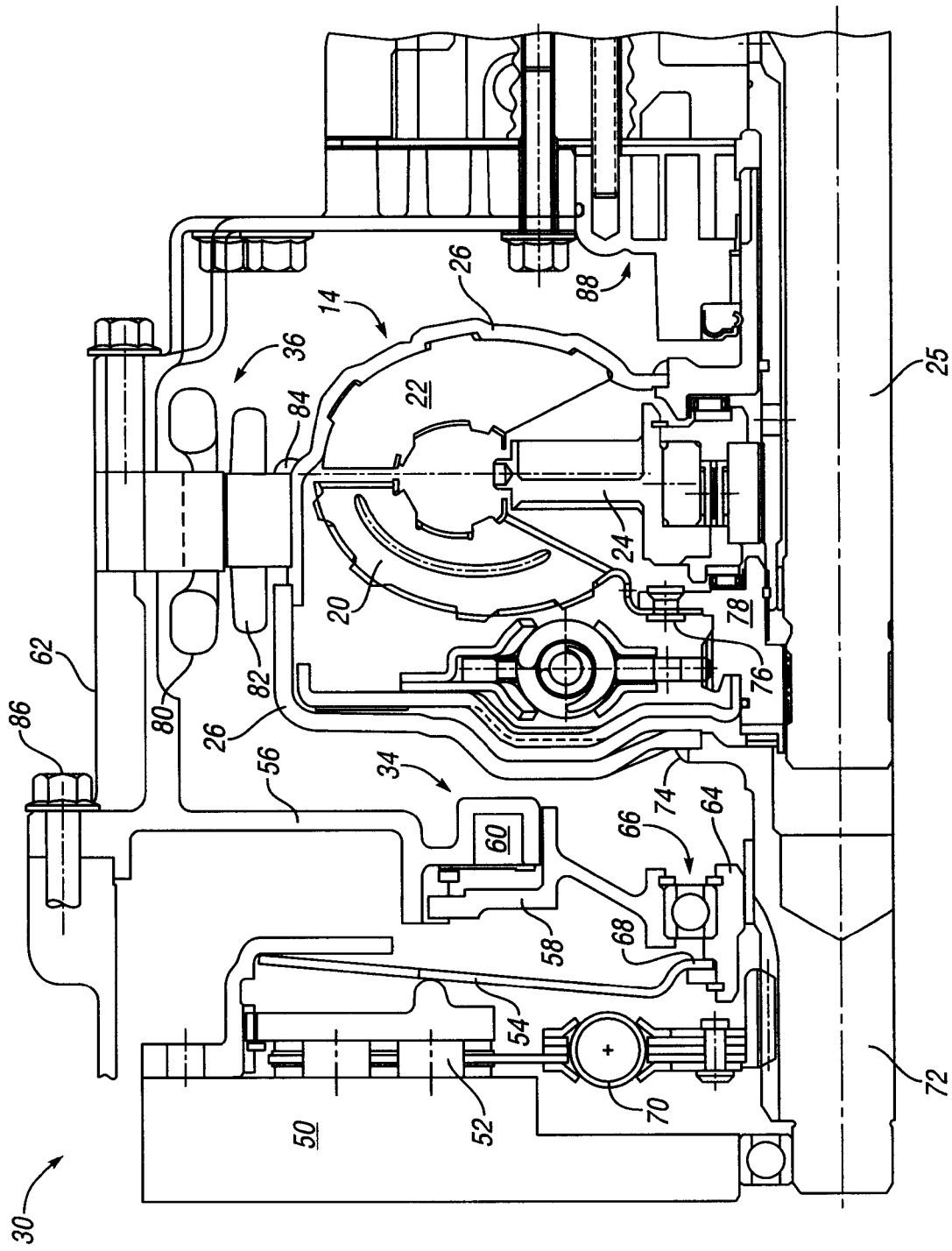
FIG. 2 is a detailed sectional view of a hybrid conversion module of FIG. 1b.

Referring to FIG. 2, the hybrid conversion module 32 is shown in more detail. Like reference numbers are used in FIG. 2 to refer to like components from FIGS. 1a-1b.

The engine 12 (shown in FIG. 1b) drives a flywheel 50. A friction plate 52 is biased into engagement with the flywheel 50 by a spring 54 such that the flywheel 50 and the friction plate 52 rotate together until the spring 54 is released. The spring 54 is preferably a Belleville type spring; however alternate spring configurations may be envisioned. The bias of the spring 54 provides a steady state condition wherein the engine 12 and the torque converter 14 are coupled and power is transferable therebetween to drive the vehicle 30.

The electro-magnetic clutch 34 is controllable to selectively release the spring 54 such that the flywheel 50 and the friction plate 52 rotate independently, and the engine 12 (shown in FIG. 1b) is thereby decoupled from the torque converter 14. The electro-magnetic clutch 34 includes a first clutch member 56, a second clutch member 58, and an electrically actuatable magnetic device 60 such as a magnetic coil. The first clutch member 56 is rigidly secured to a housing 62. The magnetic device 60 is retained by the first clutch member 56 and is positioned in close proximity to the second clutch member 58.

As will be described in detail hereinafter, the second clutch member 58 is translatable in an axial direction relative to the first clutch member 56. The second clutch member 58 is operatively connected to an annular link 64 such that the two components can rotate independently but translate in an axial direction together. To facilitate independent rotation, a bearing device 66 is preferably disposed between the second clutch member 58 and the annular link 64. The annular link 64 also retains a radially inner portion 68 of the spring 54.

As previously indicated, the friction plate 52 is biased into engagement with the flywheel 50 by the spring 54 such that engine 12 (shown in FIG. 1) and the torque converter 14 are coupled in the absence of an externally applied force. This spring bias also pulls the second clutch member 58 away from the first clutch member 56. The electro-magnetic clutch 34 is actuatable to overcome the bias of the spring 54 and thereby decouple the engine 12 from the torque converter 14. More precisely, by energizing the magnetic device 60 of the electromagnetic clutch 34, the second clutch member 58 is magnetically drawn or pulled toward the first clutch member 56. The translation of the second clutch member 58 pulls the annular link 64 and the radially inner portion 68 of the spring 54 mounted thereto such that the spring 54 is released and the friction plate 52 disengages the flywheel 50.

The friction plate 52 preferably includes one or more damper springs 70 configured to at least partially absorb any engine torque spikes. The friction plate 52 is splined to a shaft member 72 such that the two components rotate together. The shaft member 72 is preferably attached to the torque converter housing 26 such as with the weld 74. The torque converter housing 26 is attached to the impeller 22. Therefore, when the engine 12 (shown in FIG. 1b) and the torque converter 14 are coupled, engine rotation is imparted via the flywheel 50 to the friction plate 52, to the shaft member 72, to the torque converter housing 26, and to the impeller 22 thereby causing the impeller 22 to rotate. Impeller rotation 22 spins the turbine 20 in the manner described hereinabove. The turbine 20 is attached, such as with a rivet 76, to a coupling member 78. The coupling member 78 is splined to the transmission input shaft 25 such that turbine rotation drives the transmission input shaft 25 and thereby powers the vehicle 30.

The electric motor/generator 36 includes a stator 80 and a rotor 82. The stator 80 is mounted to an internal surface of the housing 62 and remains stationary relative to the rotor 82. The rotor 82 is mounted to an external surface of the torque converter housing 26 and rotates relative to the stator 80 along with the torque converter housing 26. Therefore, the electric motor/generator 36 can draw electricity from the battery 38 (shown in FIG. 1b) in order to rotate the torque converter housing 26 and thereby power the vehicle 30. Alternatively, rotation of the torque converter housing 26 generated by the engine 12 or during vehicle deceleration may be converted to electricity by the electric motor/generator 36 and stored in the battery 38.

The hybrid conversion module 32 is configured to easily attach to a non-hybrid vehicle such as the vehicle 10 (shown in FIG. 1a) and convert it to a light hybrid vehicle such as the light hybrid vehicle 30. The electric motor/generator 36 is preferably directly attached to the torque converter housing 26 in a conventional manner such as, for example, with the weld 84. The electro-mechanical clutch 34 may be disposed in a preexisting area between the flywheel 50 and the torque converter housing 26, and may be secured to the housing 62 with a threaded fastener 86.

By mounting the electric motor/generator 36 directly to the torque converter housing 26, fluid flow within the torque converter 14 may be implemented to cool the rotor 82. More precisely, the heat generated by the rotor 82 is transmitted through the torque converter housing 26 where it is exposed to and absorbed by the working fluid (not shown) within the torque converter 14. As the working fluid exits the torque converter, it is directed outward and thru the support housing of stator 80 via a coolant channel (not shown) which is similar to the coolant channel 100 shown in FIG. 3. This transfer of fluid maintains a common temperature of the rotor 82 and the stator 80, and thereby provides consistency in clearances of the rotor and stator air gap necessary to provide excellent performance. The fluid is then preferably sent to a transmission oil cooler (not shown) and returned to the transmission lubrication system (not shown).

Locking the rotor 82 to the torque converter 14 allows "hill holding" by controlling the speed of the electric motor/generator 36. For purposes of the present invention, "hill holding" refers to the ability of the vehicle 30 to maintain position on an incline or decline without moving. During motion, at powers up to the limit of the electric device, maintaining speed control in the torque converter, ensures, transparent connect or disconnect of the engine. The electric motor/generator 36 maintains the same input to the torque converter 14, which will ensure the same output torque and speed of this device, and therefore, the same vehicle propulsion characteristics. This simplifies control algorithms by simple speed match algorithms which may be stored in an electronic control unit (not shown).

The hybrid conversion module 32 may be implemented to electrically launch the vehicle 30 and thereby improve fuel consumption. During such operation, the rotor 82 preferably drives the main transmission pump 88 to maintain coolant flow and clutch pressure. The engine 12 is thereafter preferably started by balancing the power transfer to the clutch 34 and the engine 12 while the vehicle 30 is driving.

Figure 3:
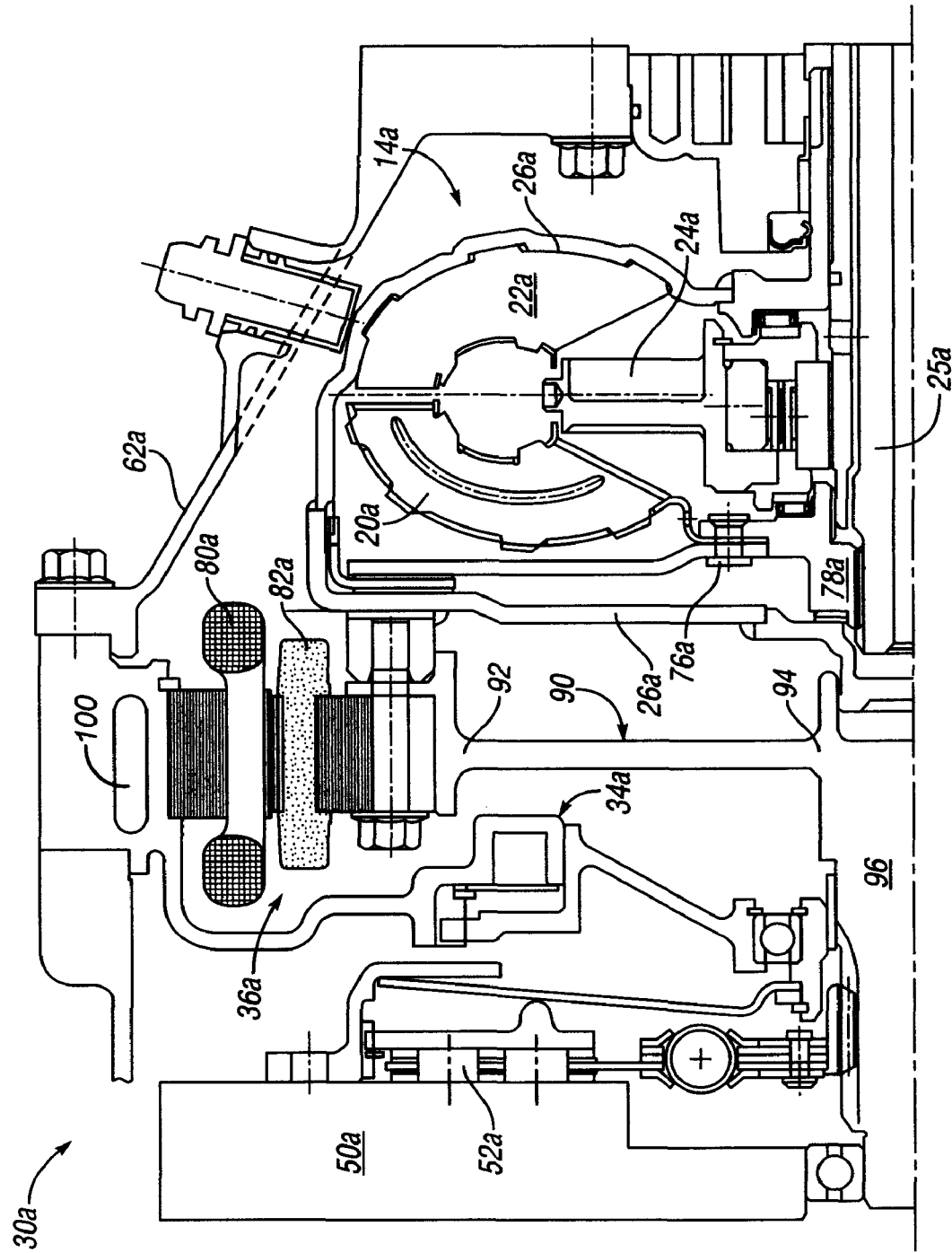
FIG. 3 is a detailed sectional view of an alternate embodiment of the hybrid conversion module of FIG. 1b.

Referring to FIG. 3, an alternate embodiment of a hybrid conversion module 32 is shown. Like reference numbers are used in FIG. 3 to refer to like components from FIG. 2. Additionally, the suffix "a" added to a reference numeral identifies a similar component in a different embodiment.

The electro-magnetic clutch 34a functions similarly to the electro-magnetic clutch 34 (shown in FIG. 2) described hereinabove, and will therefore not be described further. The stator 80a is mounted to an internal surface of the housing 62a and remains stationary relative to the rotor 82a. The rotor 82a is mounted to a transfer member 90. The transfer member 90 is preferably generally annular and includes a radially outer portion 92 to which the rotor 82a is mounted, and a radially inner portion 94 integrally extending from a shaft member 96. Although the transfer member 90 is preferably an integral extension of the shaft member 96, the two components may alternately be attached together in any conventional manner. The transfer member 90 is attached to the torque converter housing 26a such that the rotor 82a, the transfer member 90, the torque converter housing 26a, and the shaft member 96 all rotate together.

The friction plate 52a is splined to the shaft member 96 such that the two components rotate together. Therefore, when the engine 12 (shown in FIG. 2) and the torque converter 14a are coupled, engine rotation is imparted via the flywheel 50a to the friction plate 52a, to the shaft member 96, to the transfer member 90, and then to both the rotor 82a and the torque converter housing 26a. Rotation of the torque converter housing 26a causes the impeller 22a to rotate. Impeller rotation spins the turbine 20a in the manner described hereinabove with respect to the turbine 20 (shown in FIGS. 1b and 2), and a stator 24a is operational to multiply torque in the manner previously described with respect to the stator 24 (shown in FIG. 2). The turbine 20a is attached, such as with a rivet 76a, to a coupling member 78a. The coupling member 78a is splined to a transmission input shaft 25a such that turbine rotation drives the transmission input shaft 25a and thereby powers the vehicle 30a.

The electric motor/generator 36a can draw electricity from the battery 38 (shown in FIG. 1b) in order to rotate the torque converter housing 26a and thereby power the vehicle 30a. Alternatively, rotation of the transfer member 90 either by the engine 12 (shown in FIG. 1b) or during vehicle deceleration may be converted to electricity by the electric motor/generator 36a and stored in the battery 38.

Fluid from the torque converter 14a may be implemented to cool the electric motor/generator 36a. More precisely, fluid exiting the torque converter is directed outward and then thru the support housing of stator 80a via a coolant channel 100 in order to absorb motor heat and thereby cool the electric motor/generator 36a. The fluid is then preferably sent to a transmission oil cooler (not shown) and returned to the transmission lubrication system (not shown).

While the best modes for carrying out the invention have been described in detail, those familiar with the art to which this invention relates will recognize various alternative designs and embodiments for practicing the invention within the scope of the appended claims.

The invention claimed is:

1. A hybrid conversion module for a vehicle with an engine comprising:
    an electric motor/generator attached directly to a torque converter such that the electric motor/generator can transmit power to the torque converter and thereby drive the vehicle;
    an energy storage device operatively connected to the electric motor/generator, said energy storage device configured to transmit energy to and receive energy from the electric motor/generator; and
    a clutch configured to selectively decouple the engine from the torque converter when the clutch is engaged and the electric motor/generator transmits power to the torque converter;
    wherein the hybrid conversion module is adapted to attach to the vehicle and thereby convert the vehicle into a light hybrid vehicle.

2. The hybrid conversion module of claim 1, wherein the electric motor/generator is configured to transmit heat through a housing of the torque converter wherein the heat is absorbed by working fluid within the torque converter in order to cool the electric motor/generator.

3. The hybrid conversion module of claim 1, wherein the vehicle has a transmission pump; and wherein the electric motor/generator is configured to drive the transmission pump such that coolant flow and clutch pressure are maintained when the vehicle is electrically driven.

4. The hybrid conversion module of claim 1, wherein the clutch is an electro-magnetic clutch.

5. The hybrid conversion module of claim 1, wherein the storage device is a battery.

6. A light hybrid vehicle comprising:
    an engine;
    a torque converter operatively connected to the engine; and
    a hybrid conversion module operatively connected to the torque converter including:
        an electric motor/generator operatively connected to the torque converter;
        a storage device operatively connected to the electric motor/generator, said storage device configured to transmit energy to and receive energy from the electric motor/generator when the electric motor/generator functions as a motor and as a generator, respectively; and
        a clutch disposed between the engine and the torque converter, the clutch being configured to selectively decouple the engine from the torque converter when the clutch is engaged and the electric motor/generator functions as a motor.

7. The light hybrid vehicle of claim 6, wherein the electric motor/generator is mounted directly to the torque converter such that the torque converter may be implemented to cool the electric motor/generator.

8. The light hybrid vehicle of claim 6, wherein the vehicle has a transmission pump; and wherein the electric motor/generator is configured to drive the transmission pump such that coolant flow and clutch pressure are maintained when the vehicle is electrically driven.

9. The light hybrid vehicle of claim 6, wherein the clutch is an electro-magnetic clutch.

10. The light hybrid vehicle of claim 6, wherein the storage device is a battery.

11. The light hybrid vehicle of claim 6, further comprising:
a transfer member selectively connected for rotation with the engine via the clutch and continuously connected for rotation with the torque converter; and wherein the electric motor/generator is mounted to the transfer member such that the electric motor/generator is continuously connected for common rotation with the transfer member.

12. A light hybrid vehicle comprising:
an engine;
a torque converter selectively connected to the engine; and
a hybrid conversion module operatively connected to the torque converter including:
  an electric motor/generator mounted directly to the torque converter, said electric motor/generator operable to transmit power to the torque converter and thereby drive the light hybrid vehicle;
  a battery operatively connected to the electric motor/generator, said battery configured to transmit energy to and receive energy from the electric motor/generator; and
  a clutch disposed between the engine and the torque converter, the clutch configured to selectively decouple the engine from the torque converter when the clutch is engaged and the electric motor/generator functions as a motor.

13. The light hybrid vehicle of claim 12, wherein the vehicle has a transmission pump; and wherein the electric motor/generator is configured to drive the transmission pump such that coolant flow and clutch pressure are maintained when the vehicle is electrically driven.

14. The light hybrid vehicle of claim 12, wherein the clutch is an electro-magnetic clutch.

* * * * *